United States Patent [19]

Ledbetter, Jr. et al.

[11] Patent Number: 5,119,485
[45] Date of Patent: Jun. 2, 1992

[54] METHOD FOR DATA BUS SNOOPING IN A DATA PROCESSING SYSTEM BY SELECTIVE CONCURRENT READ AND INVALIDATE CACHE OPERATION

[75] Inventors: William B. Ledbetter, Jr.; Russell A. Reininger, both of Austin, Tex.

[73] Assignee: Motorola, Inc., Schaumberg, Ill.

[21] Appl. No.: 351,898

[22] Filed: May 15, 1989

[51] Int. Cl.⁵ .............................................. G06F 12/08
[52] U.S. Cl. ............................... 395/425; 364/DIG. 1
[58] Field of Search ................. 364/200, 900; 395/400, 395/425

[56] References Cited

U.S. PATENT DOCUMENTS

| | | | |
|---|---|---|---|
| 4,410,944 | 10/1983 | Kronies | 364/200 |
| 4,612,612 | 9/1986 | Woffinden et al. | 364/200 |
| 4,747,043 | 5/1988 | Rodman | 364/200 |
| 4,814,981 | 3/1989 | Rubinfeld | 364/200 |
| 4,858,111 | 8/1989 | Steps | 364/200 |
| 4,912,632 | 3/1990 | Gach et al. | 364/200 |
| 4,928,225 | 5/1990 | McCarthy et al. | 364/200 |
| 4,933,835 | 6/1990 | Sachs et al. | 364/200 |
| 4,939,641 | 7/1990 | Schwartz et al. | 364/200 |
| 4,985,829 | 1/1991 | Thatte et al. | 364/200 |
| 5,025,365 | 6/1991 | Mathur et al. | 364/200 |
| 5,029,070 | 7/1991 | McCarthy et al. | 364/200 |
| 5,043,886 | 8/1991 | Witek et al. | 364/200 |

OTHER PUBLICATIONS

"Boost DRAM performance with SRAM caching scheme," Electronic Design, Jim Langston, Jun. 9, 1988, pp. 107–112.

Primary Examiner—Stuart N. Hecker
Assistant Examiner—Reba I. Elmore
Attorney, Agent, or Firm—Robert L. King

[57] ABSTRACT

A bus snoop control method for maintaining coherency between a write-back cache and main memory during memory accesses by an alternate bus master. The method and apparatus incorporates an option to source 'dirty' or altered data from the write-back cache to the alternate bus master during a memory read operation, and simultaneously invalidate 'dirty' or altered data from the write-back cache. The method minimizes the number of cache accesses required to maintain coherency between the cache and main memory during page-out/page-in sequences initiated by the alternate bus master, thereby improving system performance.

14 Claims, 3 Drawing Sheets

| SNOOP CONTROL SC0,SC1 | OPERATION |
|---|---|
| 00 | SNOOP INHIBITED |
| 01 | SNOOP ENABLED (LEAVE DIRTY):<br>   READ HIT ON CLEAN LINE IS IGNORED.<br>   READ HIT ON DIRTY LINE SUPPLIES<br>     DATA AND LEAVES THE LINE DIRTY.<br>   WRITE HIT INVALIDATES LINE. |
| 10 | SNOOP ENABLED (MARK CLEAN):<br>   READ HIT ON CLEAN LINE IS IGNORED.<br>   READ HIT ON DIRTY LINE SUPPLIES<br>     DATA AND MARKS THE LINE AS CLEAN.<br>   WRITE HIT INVALIDATES LINE. |
| 11 | SNOOP ENABLED (MARK INVALID):<br>   READ HIT ON CLEAN LINE INVALIDATES LINE.<br>   READ HIT ON DIRTY LINE SUPPLIES<br>     DATA AND INVALIDATES LINE.<br>   WRITE HIT INVALIDATES LINE. |

*FIG.3*

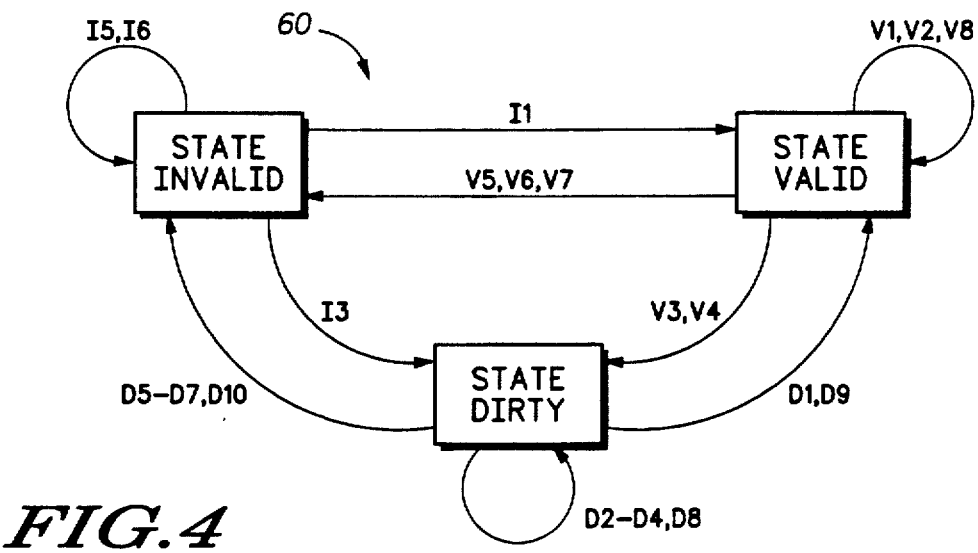

METHOD FOR DATA BUS SNOOPING IN A DATA PROCESSING SYSTEM BY SELECTIVE CONCURRENT READ AND INVALIDATE CACHE OPERATION

TECHNICAL FIELD

This invention relates to 'write-back' caches, and more particularly, to a method for handling inconsistent data in 'write-back' caches during memory accesses by an alternate data bus master.

BACKGROUND OF THE INVENTION

Caching schemes have been employed by computer designers to reduce access times by a Central Processor Unit (CPU) to main memory, and hence, increase system performance. In many computing systems, main memory consists of a large array of memory devices with speeds which are slow relative to processor speeds. During accesses to main memory, the processor is forced to insert additional wait states to accommodate the slower memory devices. System performance during memory accesses can be enhanced with a cache. Smaller in size than main memory and significantly faster, the cache provides fast local storage for data and instruction code which is frequently used by the processor. In computing systems with caches, memory operations by the processor are first transacted with the cache. The slower main memory is only accessed by the processor if the memory operation cannot be completed with the cache. In general, the processor has a high probability of fulfilling a majority of its memory operations with the cache. Consequently, in computing systems which employ a cache, effective memory access times between a processor and relatively slow main memory can be reduced.

Caches can be highly optimized according to a number of different features. One important feature which affects cache performance and design complexity is the handling of writes by the processor or an alternate bus master. Because two copies of a particular piece of data or instruction code can exist, one in main memory and a duplicate copy in the cache, writes to either main memory or the cache can result in an incoherence between the two storage systems. For example, specific data is stored in a predetermined address in both the cache and main memory. During a processor write to the predetermined address, the processor first checks the contents of the cache for the data. Finding the data in the cache, the processor proceeds to write new data into the cache at the predetermined address. Because data is modified in the cache but not in main memory, the cache and main memory become incoherent. Similarly in systems with an alternate bus master, Direct Memory Access (DMA) writes to main memory by the alternate bus master modify data in main memory but not the cache. Again, the cache and main memory become incoherent.

An incoherence between the cache and main memory during processor writes can be handled with two techniques. In a first technique, a 'write-through' cache guarantees consistency between the cache and main memory by writing to both the cache and main memory during processor writes. The contents of the cache and main memory are always identical, and so the two storage systems are always coherent. In a second technique, a 'write-back' cache handles processor writes by writing only to the cache and setting a 'dirty' bit to indicate cache entries which have been altered by the processor. When 'dirty' or altered cache entries are later replaced, the modified data is written back into main memory.

Depending on which cache architecture is implemented, incoherency between the cache and main memory during a DMA read operation can be handled with bus watch or 'snooping' techniques, by instructions executed by the operating system, or combinations thereof. In a 'write-through' cache, no special techniques are required during the DMA read operation. In a 'write-back' cache, bus snooping can be employed to check the contents of the cache for altered data, sourcing data from the cache to the requesting bus master when appropriate to maintain coherency. When the cache is sourcing data to the requesting bus master, main memory is prohibited from supplying data to the requesting bus master. Alternatively, the operating system can execute an instruction to WRITE 'dirty' data from the cache into main memory prior to the DMA read operation. All 'dirty' data is written out to main memory, thereby ensuring consistency between the cache and main memory.

Similarly during a DMA write operation, incoherency between the cache and main memory can be handled with bus 'snooping' or monitoring, instructions executed by the operating system, or combinations thereof. In a 'write-through' and a 'write-back' cache, bus snooping invalidates cache entries which become 'stale' or inconsistent with main memory following the DMA write operation. Additionally, cache PUSH and INVALIDATE instructions can be executed by the operating system prior to the DMA write operation, to WRITE 'dirty' or altered data out to main memory, and to invalidate the contents of the entire cache. Since only a single copy of data exists in main memory following the instructions, the DMA write to main memory will not present the problem of possibly 'stale' data in the cache.

In virtual memory systems, data is often transferred between memory and non-volatile storage devices, such as a disk, during page-out/page-in sequences, data is transferred from memory and stored on disk, while during a page-in sequence, data is transferred from the disk and stored in memory. For example, page-out/page-in sequences can occur during context switches or during extensive data manipulation.

A number of methods exist for ensuring coherency between write-back caches and main memory during page-out/page-in sequences initiated by alternate bus masters. In a first known technique, the bus is not snooped during either the page-out operation or the page-in operation. Instead, the operating system executes PUSH and INVALIDATE instructions prior to the page-out operation. As discussed hereinabove, the PUSH instruction forces the write-back cache to search all cache entries for 'dirty' data which the pending page-out operation may access, and to copy these entries back into main memory. The INVALIDATE instruction marks data in the write-back cache which may be accessed by the page transfer as invalid. The DMA page transfer from memory to disk is performed after the execution of the two instructions, followed by a second DMA transfer from disk to memory corresponding to the page-in operation. No snooping is required during the DMA page-out operation because the write-back cache is coherent with main memory following the cache PUSH instruction. Likewise, no snooping is required during the DMA page-in operation because cache entries corresponding to the page transfer have been marked invalid, and hence, will not become 'stale' or inconsistent with the new page in main memory.

Although the first known technique for maintaining cache coherency during page-out/page-in sequences is simple to implement, the technique displays a number of disadvantages. Most importantly, the processor spends a large amount of time during the execution of the required cache PUSH and INVALIDATE instructions, sequencing through the cache in search of 'dirty' cache entries. For the duration of the instruction, the processor cannot run another task or process, and hence, this time is lost. Moreover, the processor must additionally interface with slow main memory in order to write altered cache entries back into main memory.

In a second known technique for ensuring cache coherency during page-out/page-in sequences, the bus is snooped only during the page transfer from memory to disk, with 'dirty' data being sourced from the write-back cache to the requesting bus master when appropriate to maintain coherency. Dirty data is left unaltered in the cache following the page-out operation. After the page transfer is completed, the operating system executes a cache INVALIDATE instruction before initiating the pending DMA page transfer of data from disk to memory. The INVALIDATE instruction is executed for substantially the same reasons as in the first known technique to prevent data in the write-back cache from becoming 'stale' or inconsistent with main memory during the page-in operation.

In a third known technique for ensuring cache coherency during page-out/page-in sequences, the data bus is snooped during both the page transfer from memory to disk and the page transfer from disk to memory. For substantially the same reasons as in the second known technique, 'dirty' data is sourced from the write-back cache to the requesting bus master when appropriate to maintain coherency during the page-out operation. The data bus is additionally snooped during the page-in operation, with cached entries invalidated to prevent data from becoming inconsistent with main memory.

Although the second and third techniques for ensuring cache coherency during page-out/page-in sequences provide better performance than the first technique, nevertheless, these last two techniques have a number of drawbacks. The second technique still utilizes an operating system INVALIDATE instruction which may require an inordinately large amount of time to sequence through all cache entries. The third technique improves upon the second technique by snooping during the page-in sequence in order to obviate the required execution of an INVALIDATE instruction. Despite this fact, each 'dirty' data location in the write-back cache must be accessed twice in the third known technique; once during the page-out operation to source 'dirty' or altered data to the requesting bus master, and a second time during the page-in operation to invalidate 'stale' or inconsistent data. Overall system performance can be increased if the number of accesses to the write-back cache can be minimized.

SUMMARY OF THE INVENTION

Accordingly, it is an object of the present invention to provide an improved data bus control for maintaining cache coherency in a uni-processor, single cache computing system.

Another object of the present invention is to provide an improved method for maintaining cache coherency in both a uni-processor, single cache computing system and a multi-processor, multi-cache computing system.

It is yet another object of the present invention to provide an improved mechanism for maintaining coherency between a write-back cache and main memory in a data processing system during page-out/page-in data transfer sequences.

In carrying out the above and other objects of the present invention, there is provided, in one form, a method and system for implementing a data bus snoop controller utilized by one or more alternate data bus masters. Coherency, or uniformity, of data is maintained between a cache and a main memory which are both coupled to the data bus. Data is communicated with the cache and main memory via the data bus. The bus snoop controller is implemented by creating a processor state wherein the data bus is snooped or monitored during a data bus transfer in response to a transfer request for data stored in a predetermined cache entry in the cache. During the processor state, data is supplied from the predetermined cache entry in response to the request if the bus snoop controller detects a read operation initiated by the one or more alternate bus masters and the predetermined cache entry has been altered by earlier processor activity. The predetermined cache entry is marked as either invalid or empty simultaneously with the supplying of data if the bus snoop controller detects a read operation initiated by the alternate bus master and the predetermined cache entry has been altered by earlier processor activity.

These and other objects, features, and advantages, will be more clearly understood from the following detailed description taken in conjunction with the accompanying drawings.

BRIEF DESCRIPTION OF THE DRAWINGS

FIG. 3 is a table summarizing the protocol utilized by a bus snoop controller to maintain coherency between a write-back cache and main memory; and FIG. 4 is a state diagram illustrating a method for maintaining coherency of data stored in a write-back cache and a main memory in accordance with the present invention.

DETAILED DESCRIPTION OF THE INVENTION

Figure 1:
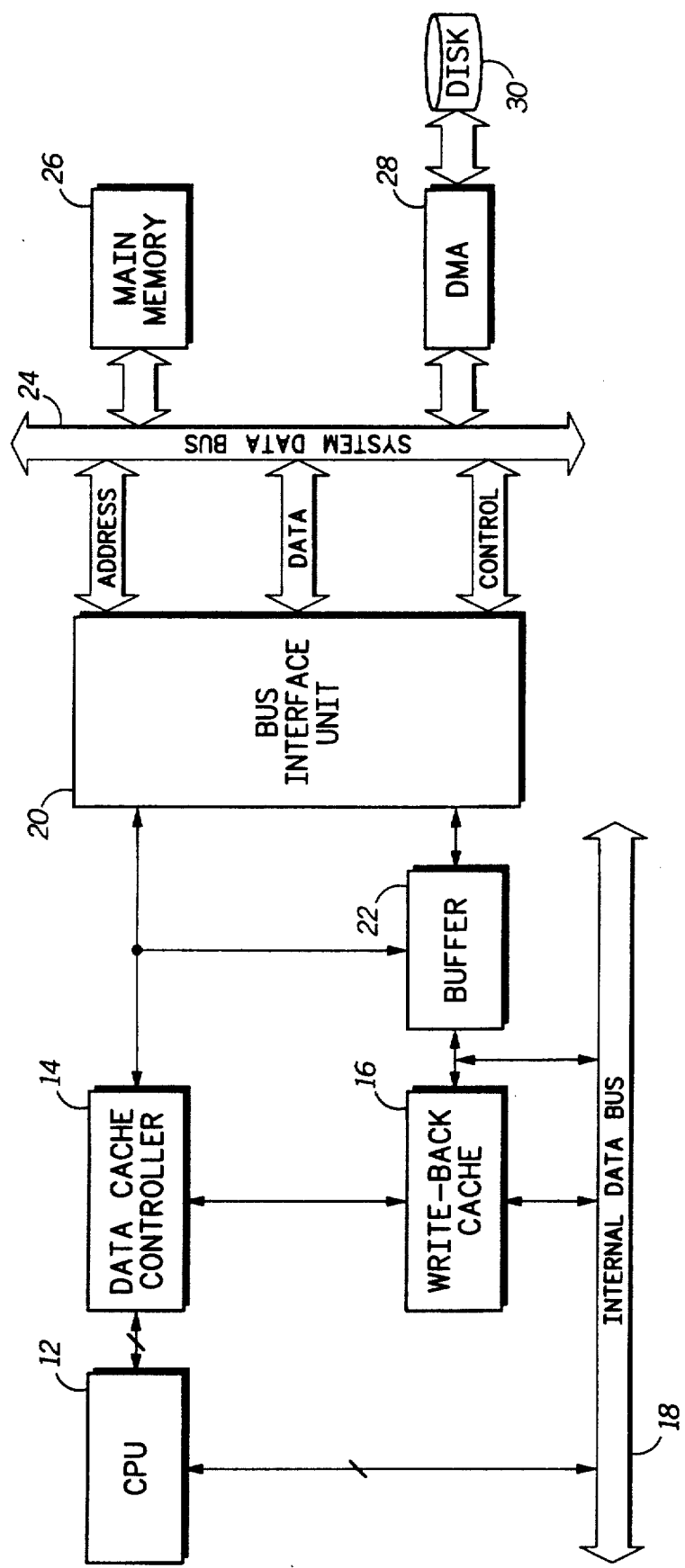
FIG. 1 is a block diagram of a computing system having data bus snoop control in accordance with the present invention.

Shown in FIG. 1 is a block diagram of a preferred embodiment of a computing system 10, having: a central processing unit, CPU 12, a data cache controller 14, a write-back cache 16, an internal data bus 18, a bus interface unit 20, a buffer 22, a system data bus 24, a main memory 26, a DMA (Direct Memory Access) unit 28, and a disk 30. Computing system 10 illustrates a typical uni-processor, single cache environment which utilizes the present invention to improve system performance during page-in/page-out sequences initiated by an alternate bus master. In the illustrated form, CPU 12 is a data execution unit which implements a predetermined instruction set. Data cache controller 14 is connected to CPU 12 and bus interface unit 20 and directs control signals illustrated in further detail subsequently between bus interface unit 20 and CPU 12. Data cache controller 14 is also connected to write-back cache 16 and manages data transfers between write-back cache 16, CPU 12, and bus interface unit 20. Data cache controller 14 and bus interface unit 20 support data bus 'snooping' of system data bus 24 to maintain coherency between write-back cache 16 and main memory 26 by monitoring system data bus 24 when CPU 12 is not the bus master. Write-back cache 16 is connected to data cache controller 14, buffer 22, and internal data bus 18. Data cache controller 14 contains logic circuitry necessary to read, write, update, invalidate, and flush write-back cache 16. It should be noted that in the preferred form, CPU 12, data cache controller 14 and write-back cache 16 operate concurrently to provide maximum sustained performance possible in computing system 10.

System data bus 24 is the system's primary data bus and has a predetermined bit width. Main memory 26 is a physical memory of a predetermined size and is coupled to system bus 24. DMA unit 28 functions as an alternate data bus master of system bus 24 and manages data transfers between system bus 24 and disk 30. Disk 30 represents a permanent data storage system connected to DMA unit 28.

Additionally, internal data bus 18 communicates data between write-back cache 16, buffer 22 and CPU 12. Bus interface unit 20 is coupled to system data bus 24 through an address bus labeled "Address", a data bus labeled "Data", and a control bus labeled "Control". Bus interface unit 20 is a system data bus controller which manages the interfacing between system data bus 24 and each of CPU 12, data cache controller 14 and write-back cache 16. Buffer 22 is a data buffer for intermediate data storage during data transfers between write-back cache 16 and bus interface unit 20. Buffer 22 allows a key feature of the present invention to be implemented. Should an alternate bus master such as DMA unit 28 request a read operation of data in write-back cache 16, the data is transferred to buffer 22 for storage. After all the data being requested by the alternate bus master, regardless of size, is loaded into buffer 22, and only when computing system 10 is in the "Mark Invalid" state as discussed below, the data is marked INVALID in write-back cache 16 concurrent with being coupled to DMA unit 28 via bus interface unit 20 and system bus 24. The data is automatically marked INVALID because it is assumed that the data will be modified since it is being read. Therefore, the data value being read is no longer valid in write-back cache 16. It should be noted that while the data is being coupled to DMA unit 28, write-back cache 16 is available for use with CPU 12 for other processing.

When DMA unit 28 assumes bus mastership of system data bus 24 and requires data, the data which is required by DMA unit 28 is read either from main memory 26 or from write-back cache 16 of the processor comprising CPU 12, data cache controller 14, write-back cache 16, buffer 22 and bus interface unit 20. Only one of main memory 26 or write-back cache 16 will supply the data, and it is the processor comprising CPU 12, etc. which determines which memory supplies the data. A memory inhibit control signal (not shown) which is coupled onto system bus 24 from the processor comprising CPU 12, etc., to main memory 26 prohibits main memory 26 from responding to memory read requests of DMA unit 28. When DMA unit 28 requests read data on the system data bus 24, the processor comprising CPU 12, etc., snoops by looking internally in write-back cache 16 and decides whether or not the data is present in write-back cache 16 while main memory 26 is inhibited. If the data to be read is present in write-back cache 16, as is evidenced by a cache "hit", the read data is supplied by coupling the data into buffer 22 and invalidating the data in write-back cache 16 as described above. If the read data is not present in write-back cache 16, as is evidenced by a cache "miss", main memory 26 is released via the memory inhibit control signal to respond to DMA unit 28 and provide the read data.

In one form, write-back cache 16 may be organized as a four-way, set-associative write-back cache with predetermined data storage capability. Associated with each line of write-back cache 16 is an address tag and state information. The address tag indicates a physical address in main memory 26 corresponding to each write-back cache 16 entry. The state information is comprised of a VALID bit and a DIRTY bit, allowing for up to four possible states. It should be well understood that any grouping or all of the four possible states may be encoded and used. In the illustrated form, the VALID bit indicates whether a predetermined cache line contains valid cached data, while the DIRTY bit identifies the write status of each cache line. In an INVALID state, there is no data in the appropriate write-back cache 16 entry. In a VALID state, the write-back cache 16 entry contains data which is consistent with main memory 26. In a DIRTY state, the write-back cache 16 entry contains valid data which is inconsistent with main memory 26. Typically, the DIRTY state results when a write-back cache 16 entry is altered by a write operation.

Figure 2:
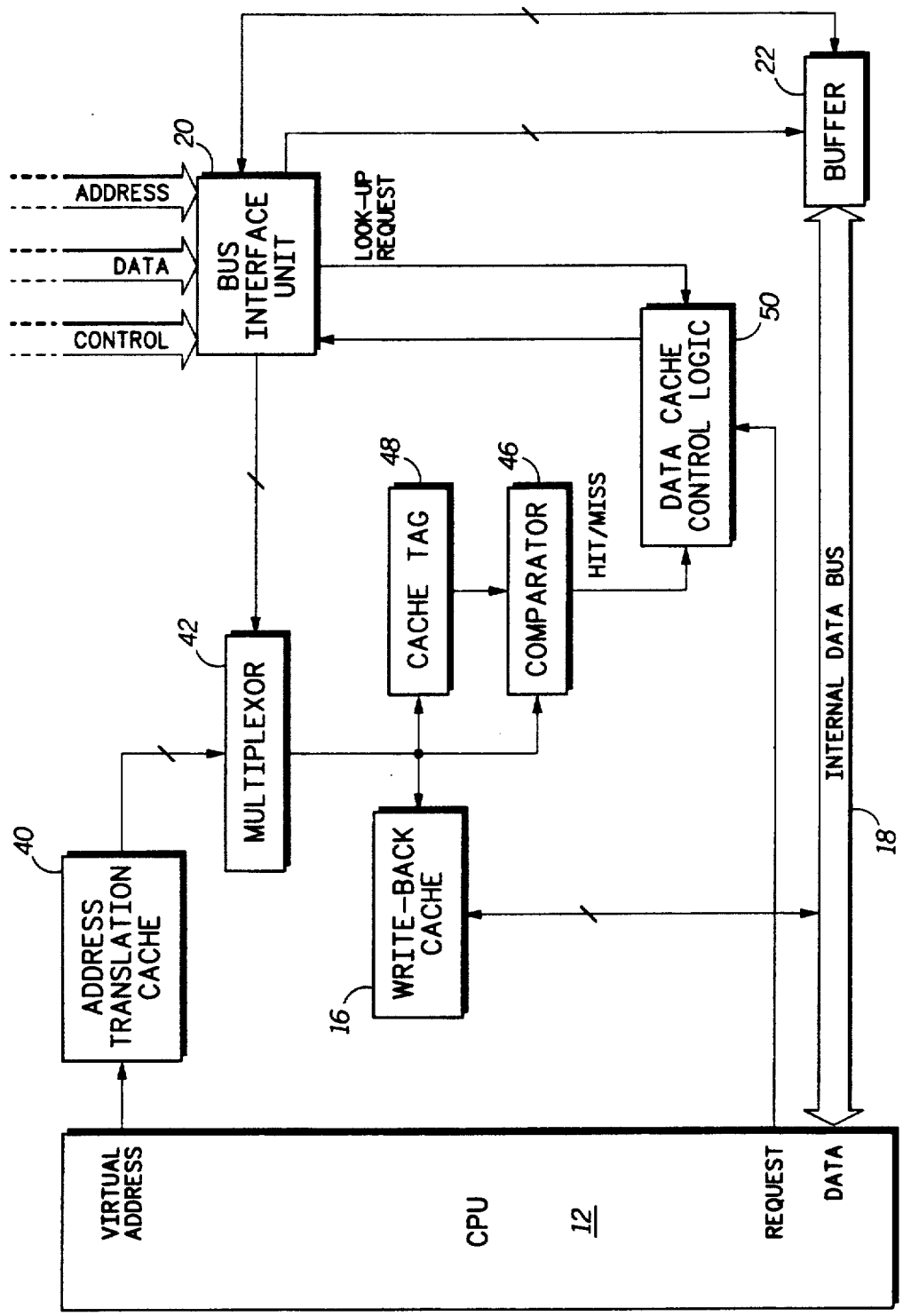
FIG. 2 is a block diagram of control circuitry associated with the bus snooping feature of the system of FIG. 1.

Shown in FIG. 2 is a block diagram illustrating in further detail an implementation of data cache controller 14 for functioning with CPU 12, write-back cache 16, buffer 22, bus interface unit 20 and system bus 24. For convenience of cross-referencing FIG. 1 and FIG. 2, each circuit portion illustrated in FIG. 1 which is duplicated in FIG. 2 is labeled with the same number. A virtual address output of CPU 12 is connected to an input of an address translation cache 40. An output of address translation cache 40 which provides a predetermined physical address is connected to a first input of a multiplex or circuit 42. A first output of bus interface circuit 20 which also provides a physical address is connected to a second input of multiplexor 42. An output of multiplexor 42 is connected to a first input of a comparator 46. Write-back cache 16 has a first input/output terminal connected to internal data bus 18 which connects a data input/output terminal of CPU 12 with a first data input/output terminal of buffer 22. Write-back cache 16 further comprises a cache tag 48. An input terminal of write-back cache 16 and an input of cache tag 48 are each connected to the output of multiplexor 42. An output of cache tag 48 is connected to a second input of comparator 46. An output of comparator 46 provides a "hit or miss" signal and is connected to a first input of a cache control logic 50. A second output of bus interface unit 20 is connected to a second input of cache control logic 50 for providing a "snoop look-up request" signal. A data look-up request signal is selectively provided by CPU 12 and is connected to a third input of cache control logic 50. A control output of cache control logic 50 is connected to a control input of bus interface unit 20. A third output of bus interface unit 20 is connected to a control input of buffer 22. A second data input/output terminal of buffer 22 is connected to a data input/output terminal of bus interface unit 20. A third output of bus interface unit 20 is connected to a control input of buffer 22. Control signals not shown in detail are connected from the data cache control logic 50 to write-back cache, cache 16 tag 48 and multiplexor 42 to implement the discussed system operation.

Generally, if CPU 12 requests data requiring memory retrieval, CPU 12 inhibits main memory 26 and provides a virtual address to address translation cache 40 which provides a physical address to write-back cache 16 and cache tag 48 and a portion of the virtual address to comparator 46. A data look-up request signal is provided by CPU 12 to data cache control logic 50. Data cache control logic 50 provides control signals to implement the following operation. The cache tag 48 contains a tag portion or field of the data providing current state information about the data in the write-back cache 16. The state information in cache tag 48 may be addressed by a portion of the virtual address received by address translation cache 40. The state information includes information such as VALID, INVALID and DIRTY data. This current state information is compared with the tag portion of the data provided by address translation cache 40. If the tag state data matches and the particular cache entry is either VALID or DIRTY, a "hit" is indicated and data cache control logic 50 causes write-back cache 16 to provide the addressed data to internal data bus 16 and CPU 12. This portion of the operation is conventional.

To perform a snoop operation, the bus interface unit 20 requests data cache control logic 50 to perform a snoop look-up related to a read request from an alternate bus master such as DMA unit 28 rather than from CPU 12. Again, the bus interface unit 20 initially inhibits main memory 26 from providing the requested read data. Bus interface unit 20 provides a physical address of the data via multiplexor 42 to write-back cache 16 and cache tag 48 and a portion of the virtual address to comparator 46. Cache tag 48 provides the tag portion of the data in write-back cache 16 at the physical address provided by bus interface unit 20. Comparator 46 compares the tag portions of the provided address with the stored address. If a "miss" is indicated, data cache control logic 50 sends a signal to bus interface unit 20 which releases the memory inhibit signal to main memory 26 so that main memory can provide the data to DMA unit 28. However, if a "hit" is indicated, data cache control logic 50 causes the data in write-back cache 16 to be coupled to internal data bus 16 and stored in buffer 22. From buffer 22, the data is coupled to the DMA unit 28 via bus interface unit 20 and system data bus 24 in response to a control signal provided by bus interface unit 20.

During either a memory write or read operation, write-back cache 16 is accessed by a physical address from address translation cache 40 which is compared to the tag field as described above. However, if the memory access is a write operation, the data is written into the appropriate cache entry of write-back cache 16.

During memory accesses by an alternate bus master, such as DMA unit 28 of FIG. 1, bus interface unit 20 and data cache controller 14 provide a mechanism to monitor system data bus 24 (i.e. bus snooping) to ensure cache coherency. Data cache controller 14 may be generally correlated with FIG. 2 as address translation cache 40, multiplexor 42, comparator 46, cache tag 48 and cache control logic 50. Data cache controller 14 and bus interface unit 20, which is a bus controller, function collectively to perform the snoop mechanism in system 10. Data cache controller 14 is completely unaware of activities on the system data bus 24, and bus interface unit 20 is completely unaware of the operation of write-back cache 16. When the DMA unit 28 attempts to perform an activity on the system data bus 24 which the bus interface unit 20 recognizes, bus interface unit 20 must ask write-back cache 16 for data. Similarly, write-back cache 16 is unaware of a data bus access by DMA unit 28 except for the interaction with bus interface unit 20. Since both CPU 12 and the DMA unit 28 via bus interface unit 20 must access write-back cache 16, bus interface unit 20 is given priority over CPU 12. Thus, bus snooping precludes memory accesses by CPU 12 for the duration of the bus snooping operation. In the illustrated form, the alternate bus master DMA unit 28 determines which bus cycles are snooped and the actions which are taken to maintain cache coherency, by asserting a specific state on the system data bus 24 which can be detected by bus interface unit 20. In one form, the snoop mode state may be asserted on system data bus 24 with two bits SC0 and SC1 of a snoop control signal coupled to bus interface unit 20 and encoded as illustrated in a table in FIG. 3. The snoop control signal is coupled to data cache control logic 50 from DMA unit 28 via the control data bus coupled to system data bus 24 and bus interface unit 20.

The table in FIG. 3 summarizes a cache consistency protocol which supports memory accesses by alternate bus masters and ensures cache coherency. As illustrated in FIG. 3, in a 'snoop-inhibit' state encoded by a logic low value of both snoop control bits, data bus snooping is inhibited. In a 'leave-dirty' snoop state encoded by a logic low value for snoop control bit SC1 and a logic high value on snoop control bit SC0, bus snooping is enabled, but DIRTY cache entries are left in the DIRTY state. If the memory operation is a read request for a cache entry in the VALID state, no action to change the cache entry state is taken. The cache entry may either be read out of cache as described above or ignored, in which case the main memory 26 is addressed to obtain the data. If the memory operation is a read request for a cache entry in the DIRTY state, data is supplied from the cache entry as previously described to maintain coherency. If the memory operation is a write request to a cache entry, the cache entry in cache tag 48 is placed in the INVALID state. It should be noted that the first and second states where clean line data is not provided by the cache have been previously implemented with a single bit snoop-inhibit (SI) signal coupled to a controller.

In a 'mark-clean' state encoded by a logic high value for snoop control bit SC0 and a logic low value for snoop control bit SC1, bus snooping is enabled and dirty cache entries are marked clean or VALID in cache tag 48. If the memory operation is a read request for a cache entry in the VALID state, no action to change the cache entry state is taken. The data may either be read from cache as previously described or read from main memory 26. If the memory operation is a read request for a cache entry in the DIRTY state, data is supplied from the cache to maintain coherency, and the cache entry's state is changed and marked as VALID. A write request to a cache entry in this snoop state automatically causes data cache control logic 50 to mark the cache entry as INVALID. The 'mark clean' state allows DMA page-out operations to mark cache entries as clean or VALID concurrently with writing data from cache entries out to disk. This obviates the expensive PUSH instruction required in the prior art before a DMA page-in operation to the same page. Furthermore, the 'mark-clean' option permits computing systems with multiple bus masters and one write-back cache to update main memory. In particular, dirty data from the cache can be identified and copied to main memory while the dirty data is sourced to the alternate bus master. System performance may be increased because the number of PUSH instructions required to maintain cache coherency will tend to decrease, thereby increasing the available bus bandwidth. This increased performance may require increased external main memory control circuitry. Additional external control circuitry associated with main memory 26 may be required to permit memory updates while dirty data is sourced to the alternate bus master. Main memory 26 must be able to capture data at the rate which the data is transferred on the system data bus 24. In general, this transfer rate is determined by processor speeds and not memory speeds.

In a 'mark-invalid' state indicated by a logic high value for both snoop control bits, bus snooping is enabled by DMA unit 28 and the state of dirty cache entries are modified and marked INVALID. If the memory operation is a read request for a cache entry, the cache entry is placed in the INVALID state. If the memory operation is a read request for a cache entry in the DIRTY state, data is supplied from the cache entry to maintain coherency, and the cache entry is simultaneously marked INVALID. If the memory operation is a read request for a cache entry in the VALID or clean state, data may or may not be supplied from the cache entry to DMA unit 28 depending upon design choice. If data is not supplied from the cache entry, the DMA unit 28 must obtain the data from main memory 26. Further, a write request to a cache entry invalidates the cache entry regardless of the state of the entry. The 'mark-invalid' state obviates bus snooping in uniprocessor systems during DMA page-in operations, as will be discussed later.

The 'mark-invalid' state adds limited support for computing systems with multiple caches. Cache coherency between separate caches with shared data can be maintained by permitting only one of the duplicate cache entries to be in the VALID state. The remaining cache entries are forced into the INVALID state. As a particular shared piece of data is moved from a cache possessing or "owning" data to a requesting cache, the cache entry in the "owning" cache is marked INVALID while the duplicate cache entry in the "requesting" cache is marked VALID. It should be noted that the multi-cache coherency protocol discussed herein results in lower performance compared to other multi-cache coherency protocols which allow cached data to be shared and reside in multiple caches. Therefore, the 'mark-invalid' state is primarily useful for single cache, multi-processor systems.

It should be appreciated that the cache coherency protocol herein described is also oriented to a uniprocessor system with DMA. In fact, the primary emphasis of the cache coherency protocol is for DMA activity to memory pages which are not currently being accessed by the processor. The following example illustrates a typical page-out/page-in sequence in computing system 10 of FIG. 1, which utilizes the cache coherency protocol of the present invention.

On a page-out operation, DMA unit 28 indicates to data cache controller 14 to snoop the following memory read transfer. Snoop control bits SC0 and SC1 are asserted according to the protocol described in FIG. 3 to select the 'mark-invalid' option which enables bus snooping during the memory read. A cache hit in connection with read data being supplied by main memory 26 on a clean or VALID entry marks the entry as INVALID, while a cache hit in connection with data from write-back cache 16 on an altered or DIRTY entry sources the data from write-back cache 16 to disk 30 and also marks the entry as INVALID. It should be noted that the memory page being moved out to disk 30 no longer resides in write-back cache 16, and an operating system FLUSH instruction has not been executed prior to the page-out operation. On the following page-in operation, DMA unit 28 indicates to data cache controller 14 to not snoop the following memory write transfer. Snoop control bits SC0 and SC1 are asserted according to the protocol described in FIG. 3 to select the 'snoop-inhibit' option. Bus snooping is inhibited during the memory write, because all data corresponding to the memory page and formerly residing in write-back cache 16 has been invalidated. Thus, the memory page can be copied to main memory 26 without cache entries in write-back cache 16 becoming inconsistent or 'stale'.

Shown in FIG. 4 is a state diagram 60 which illustrates the transitions between states of a predetermined entry in the write-back cache 16 during memory accesses by the CPU 12 or the alternate bus master DMA unit 28. As shown in state diagram 60, each entry in write-back cache 16 can be in one of three possible states, a VALID state, an INVALID state, or a DIRTY state. Transitions between states are identified by arrows and labelled with capital letters which indicate the state (V=VALID, I=INVALID, and D=DIRTY) followed by a number. It should be noted that not all numbered cases are possible so that not all numbers are listed in FIG. 4. The following pseudo-code describes a cache entry in the INVALID state in more detail. The labelling scheme of FIG. 4 is continued in the pseudo-code.

| state INVALID | |
|---|---|
| case I1: | (Read miss from processor.) Read cache line from memory. Supply data to processor. Set VALID bit. Go to state VALID. |
| case I2: | (Read hit from processor.) Not possible. |
| case I3: | (Write miss from processor.) Read cache line from memory. Write data into line in cache. Set DIRTY bit of appropriate line. Set VALID bit. Go to state DIRTY. |
| case I4: | (Write hit from processor) Not possible. |
| case I5: | (Cache invalidate) Stay here. |
| case I6: | (Cache push) Stay here. |
| case I7: | (Alternate bus master write hit - snooped) Not possible. |
| case I8: | (Alternate bus master read hit - snooped) Not possible. |

For state INVALID, there are eight described cases. In case I1, the memory access is a processor read operation for data not contained in the write-back cache 16. The appropriate data is copied to the cache entry from main memory 26, supplied to the processor, and the cache entry changes to state VALID. In case I2, the memory access is a processor read operation that results in a cache hit. Since the present cache entry is in the INVALID state, this is not possible. In case I3, the memory access is a processor write operation that results in a cache miss. The appropriate data is fetched from main memory 26 and copied to the write-back cache 16. The processor completes the write operation by writing into the write-back cache 16. The cache entry changes to the DIRTY state. In case I4, the memory access is a processor write operation that results in a cache hit. Since the present cache entry is in the INVALID state, this is not possible. In case I5, a cache invalidate instruction has been issued by the operating system. The INVALID cache entry remains INVALID. In case I6, a cache push instruction has been issued by the operating system. Again, the INVALID cache entry remains INVALID. Lastly, in cases I7 and I8, the memory access is either an alternate bus master write or a read operation that results in a cache hit. Since the present cache entry is in the INVALID state, these accesses are not possible.

The following second piece of pseudo-code describes a cache entry in the VALID state:

```
state VALID
    case V1:    (Read miss from processor - replace entry.)
                Read cache line from memory.
                Supply data to processor.
                Stay here.
    case V2:    (Read hit from processor)
                Supply data to processor.
                Stay here.
    case V3:    (Write miss from processor - replace entry.)
                Read cache line from memory.
                Write data into line in cache.
                Set DIRTY bit of appropriate line.
                Go to state DIRTY.
    case V4:    (Write hit from processor.)
                Write data into cache line.
                Set DIRTY bit of appropriate line.
                Go to state DIRTY.
    case V5:    (Cache invalidate.)
                Go to state INVALID.
    case V6:    (Cache push.)
                Go to state INVALID.
    case V7:    (Alternate bus master write hit - snooped.)
                Go to state INVALID.
    case V8:    (Alternate bus master read hit - snooped.)
                Stay here.
```

For state VALID, there are eight possible cases. In case V1, the memory access is a processor read operation for data not contained in the write-back cache 16. The appropriate data is read from main memory 26 and supplied to the processor, CPU 12. The data in the present cache entry is replaced with the new data, and the cache entry remains VALID. In case V2, the memory access is a processor read operation that results in a cache hit. The appropriate data is supplied from write-back cache 16 and the cache entry remains VALID. In case V3, the memory access is a processor write operation that results in a cache miss. The appropriate data is read from main memory 26 and written into write-back cache 16. The processor writes new data into the present cache entry, changing the state to DIRTY. In case V4, the memory access is a processor write operation that results in a cache hit. New data is written into the present cache entry by the processor, changing the state to DIRTY. In case V5, a cache invalidate instruction has been issued by the operating system. The present cache entry goes to state INVALID. In case V6, a cache PUSH instruction has been issued by the operating system. The present cache entry goes to state INVALID. In case V7, bus snooping detects a write operation by an alternate bus master that results in a cache hit. The present cache entry is changed to state INVALID to maintain consistency. Lastly, in case V8, bus snooping detects a read operation by an alternate bus master. The present cache entry remains VALID.

The following third piece of pseudo-code describes a cache entry in the DIRTY state:

```
state DIRTY
    case D1:    (read miss from processor - replace entry.)
                Write dirty cache data (Old Entry) to memory.
                Read cache line from memory.
                Supply data to processor
                Clear DIRTY bit.
                Go to state VALID.
    case D2:    (Read hit from processor.)
                Supply data to processor.
                Stay here.
    case D3:    (Write miss from processor - replace entry.)
                Write dirty cache data (Old Entry) to memory.
                Read new cache line from memory.
                Write data into cache line.
                Stay here.
    case D4:    (Write hit from processor.)
                Write data into cache line.
                Stay here.
    case D5:    (Cache invalidate.)
                Clear VALID and DIRTY bits.
                Go to state INVALID.
    case D6:    (Cache push.)
                Write dirty cache data to memory.
                Clear VALID and DIRTY bits.
                Go to state INVALID.
    case D7:    (Alternate bus master write hit - Snooped.)
                Clear VALID and DIRTY bits.
                Go to state INVALID.
    case D8:    (Alternate bus master read hit - snooped.)
                Inhibit memory and provide data
                Stay here.
    case D9:    (Read hit from processor - Mark clean.)
                Inhibit memory and provide data.
                Clear DIRTY bit.
                Go to state VALID.
    case D10:   (Alternate bus master read hit - mark INVALID.)
                Inhibit memory and provide data.
                Clear VALID and DIRTY bits.
                Go to state INVALID.
```

For state DIRTY, there are ten possible cases. In case D1, the memory access is a processor read operation that results in a cache miss. The appropriate data is read from main memory 26 and supplied to the processor, CPU 12. The present dirty cache entry is written back to main memory 26 to maintain coherency and is replaced with the new data. The DIRTY bit is reset, and the cache entry changes to state VALID. In case D2, the memory access is a processor read operation that results in a cache hit. The appropriate data is supplied from write-back cache 16 to the CPU 12 and the cache entry remains DIRTY. In case D3, the memory access is a processor write operation that results in a cache miss. Dirty data is written back to main memory 26 from the present cache entry, and the appropriate data is read from main memory 26. The processor writes new data to the present cache entry, and the state remains DIRTY. In case D4, the memory access is a processor write operation that results in a cache hit. The processor writes new data into the present cache entry and the state remains DIRTY. In case D5, a cache INVALIDATE instruction has been issued by the operating system. The valid and dirty bits are cleared, and the present cache entry changes to state INVALID. In case D6, a cache PUSH instruction has been issued by the operating system. Dirty data is written back to main memory 26 from the present cache entry to maintain consistency, the valid and dirty bits are cleared and the state changes to INVALID. In case D7, bus snooping detects a write operation by an alternate bus master indicating 'snoop'. The valid and dirty bits are cleared, and the present cache entry goes to state INVALID. In case D8, bus snooping detects a read operation by an alternate bus master that hits in the cache. Dirty data is supplied from the present cache entry to fulfill the read request and the entry remains DIRTY. In case D9, bus snooping detects a write operation by an alternate bus master that hits in the cache, where the alternate bus master indicates "mark clean". Dirty data is supplied from the present cache entry to fulfill the read request. The dirty bit is cleared and the present cache entry goes to state VALID. Lastly, in case D10, bus snooping detects a read operation by an alternate bus master indicating 'mark-invalid'. Dirty data is supplied from the present cache entry to fulfill the read request. The valid and dirty bits are cleared, and the present cache entry changes to state INVALID.

By now it should be apparent that a method and system, commonly referred to as 'snooping', has been provided for maintaining cache coherency in both a uni-processor single cache system and a multiprocessor multi-cache system. Previous snooping techniques required a sacrifice of system operating performance. It should also be apparent that an efficient method has been provided for maintaining coherency between a write-back cache and main memory during page-out/page-in sequences. The method taught herein enhances system performance by minimizing the number of accesses to the write-back cache and allowing the processor a maximum amount of time to continue operating. For example, the system's CPU can run separate tasks or run concurrently with a direct memory access. The DMA unit can also indicate on each data bus transfer whether or not to invalidate or mark clean a particular data value. Data PUSH instructions do not have to be executed by the system to maintain data coherency between a cache and main memory. The bus snoop control method provided herein incorporates an option to source 'dirty' or altered data from the write-back cache to an alternate bus master during a read operation, and simultaneously invalidate or mark clean the 'dirty' or altered data from the write-back cache. The present invention reduces processor control overhead in uniprocessor computer systems with write-back caches during page-out/page-in sequences, thereby improving system performance.

While there have been described hereinabove the principles of the invention, it is to be clearly understood to those skilled in the art that this description is made only by way of example and not as a limitation to the scope of the invention. Accordingly, it is intended, by the appended claims, to cover all modifications of the invention which fall within the true spirit and scope of the invention.

We claim:

1. A method for implementing a data bus snoop controller in a data processing system having a processor coupled to a data bus by a bus interface control circuit, the system being utilized by at least one alternate data bus master coupled to the data bus to maintain coherency between a write-back cache memory in the processor and a system memory during a data transfer wherein data is transferred between one of the write-back cache memory or the system memory and the alternate bus master via the data bus, said method comprising the step of:

coupling an encoded control signal from the at least one alternate data bus master to the bus interface control circuit via the data bus to selectively enable data bus snooping in the system wherein said data bus is snooped or monitored during said data transfer in response to a request by the alternate bus master for data stored in a predetermined cache entry in said write-back cache memory, said method further comprising the steps of:

in response to the bus interface control circuit detecting a first value of the control signal:
(1) supplying data from said predetermined cache entry if said bus snooping detects a read operation initiated by said alternate data bus master; and
(2) simultaneously marking said predetermined cache entry as invalid of empty; or in response to the bus interface control circuit detecting a second value of the control signal;
(1) determining if the predetermined cache entry has been previously modified and thereby placed in a dirty state, and one of:
(2) if the predetermined cache entry is in the dirty state, supplying said data from said predetermined cache entry if said bus snooping detects a read operation initiated by said alternate data bus master and not invalidating said predetermined cache entry; or
(3) if the predetermined cache entry is not in the dirty state, not supplying said data from said predetermined cache entry.

2. The method of claim 1 wherein a processor write of new data to the system memory that results in a cache hit is handled by writing said new data only to said write-back cache.

3. The method of claim 1 wherein a processor write of new data to the system memory that results in a cache hit is handled by writing said new data to both said write-back cache and to the system memory.

4. The method of claim 1 wherein said method for maintaining coherency between said cache memory and said system memory is utilized in a uniprocessor computing system with a single cache.

5. The method of claim 1 wherein said alternate bus master comprises a Direct Memory Access unit coupled to a permanent data storage means.

6. A method for implementing a data bus snoop controller utilized by an alternate data bus master coupled to a data bus, the bus snoop controller functioning to maintain coherency between a write-back cache memory of a data processor coupled to the data bus via a bus interface control circuit and a system memory also coupled to the data bus, the data bus snoop controller operating during a data bus transfer wherein data is transferred via the data bus, said method comprising:

coupling an encoded control signal from the alternate data bus master to the bus interface control circuit via the data bus to selectively inhibit snooping or monitoring of said data bus during said data bus transfer in response to the bus interface control circuit detecting a first encoded value of the encoded control signal;

detecting a second encoded value of the encoded control signal with the bus interface control circuit wherein said data bus is snooped or monitored during said data bus transfer, said method when the second encoded valve is detected further comprising the steps of:

said alternate bus master selectively requesting a write operation of data to a first predetermined address:

verifying and indicating that the first predetermined address is a first predetermined cache entry within the write-back cache:

marking said first predetermined cache entry as invalid or empty in response to writing data to the write-back cache memory: and supplying data from said first predetermined cache entry in response to said alternate bus master selectively requesting a read operation of data and in response to verifying and indicating that the requested data is at the first predetermined cache entry, the data having an identifier indicating that the data has been altered by earlier processor activity and said identifier not being modified;

detecting a third encoded value of the control signal with the bus interface control circuit wherein said data bus is snooped or monitoring during said data bus transfer, said method when the third encoded value is detected further comprising the steps of:

said alternate bus master selectively requesting a write operation of data to a second predetermined address:

verifying and indicating that the second predetermined address is a second predetermined cache entry within the write-back cache:

marking said second predetermined cache entry as invalid or empty, and supplying data to said second predetermined cache entry in response to said alternate bus master requesting the write operation; and marking said second predetermined cache entry as clean or valid simultaneously with the supplying of data in response to said alternate bus master selectively requesting a read operation of data and in responsea to verifying and indicating that the requested data is at the second predetermined cache entry; and detecting a fourth encoded value of the control signal with the bus interface control circuit wherein said data bus is snooped or monitored during said bus transfer, said method when the fourth encoded value is detected further comprising the steps of:

said alternate bus master selectively requesting a write operation of data to a third predetermined address:

verifying and indicating that the third predetermined address is a third predetermined cache entry within the write-back cache:

making said third predetermined cache entry as invalid or empty and supplying data to said third predetermined cache entry in response to said alternate bus master requesting to write operation; and marking said third predetermined cache entry as invalid or empty and supplying data from said third predetermined cache entry in response to said alternate bus master selectively requesting a read operation of data and in response to verifying and indicating that the data to be read is in the write-back cache memory.

7. The method of claim 6 wherein a processor write of new data to the system memory that results in a cache hit is handled by writing said new data only to said write-back cache.

8. The method of claim 6 wherein said method for maintaining coherency between said cache memory and said system memory is utilized in a uniprocessor computing system with a single cache.

9. The method of claim 7 wherein said alternate bus master further comprises a Direct Memory Access unit coupled to a permanent data storage means.

10. The method of claim 6 wherein said bus snoop controller is further controlled by a second control signal provided by the bus interface control circuit and which indicates whether said bus transfer is a write or read request.

11. A method for maintaining coherency between a cache memory and a main memory coupled via a data bus in a virtual memory system during a page-out/page-in sequence performed by an alternate data bus master coupled to the data bus and to a permanent data storage means, said method comprising the steps of:

performing a page-out transfer operation wherein a first page of data is transferred from said main memory and written to said permanent data storage means, said pageout transfer operation further comprising the steps of: .

coupling a bus interface control circuit to the cache memory and to the data bus;

coupling an encoded control signal from the alternate bus master to the bus interface control circuit and using the bus interface control circuit to detect one of at least two values of the control signal;

snooping or monitoring the data bus during the pageout transfer operation and in response to a read request from the alternate bus master for data which is stored in a predetermined cache entry in said cache memory, and one of:

(1) marking said predetermined cache entry as invalid or empty and simultaneously supplying the data from said predetermined cache entry to the permanent data storage means in response to a first value of the control signal; or (2) in response to a second value of the control signal, only supplying the data from said predetermined cache entry to the permanent data storage means if the predetermined cache entry has been previously modified, the predetermined cache entry not being marked as invalid; and performing a page-in transfer operation wherein a second page of data is transferred from said permanent data storage means and written to said main memory, said page-in transfer operation further comprising the step of:

inhibiting said data bus snooping of said data bus with a third value of the control signal during said page-in transfer operation.

12. The method of claim 11 wherein said cache memory is a write-back cache wherein a processor write of new data to main memory that results in a cache hit is handled by writing said new data only to said write-back cache.

13. The method of claim 11 wherein said cache memory is a write-through cache wherein a processor write of new data to main memory that results in a cache hit is handled by writing said new data to both said write-through cache and to main memory.

14. The method of claim 11 wherein said method for maintaining coherency between said cache memory and said main memory during said page-out/page-in sequence is utilized in a single processor computing system with a single cache memory.

* * * * *

UNITED STATES PATENT AND TRADEMARK OFFICE
CERTIFICATE OF CORRECTION

PATENT NO. : 5,119,485

DATED : June 2, 1992

INVENTOR(S) : William B. Ledbetter et al.

It is certified that error appears in the above-identified patent and that said Letters Patent is hereby corrected as shown below:

In Claim 1, Column 14, Line 28, change "of" to -- or --.

In Claim 6, Column 15, Line 50, change "responsea" to -- response --.

Signed and Sealed this

Thirty-first Day of August, 1993

Attest:

Attesting Officer

BRUCE LEHMAN

Commissioner of Patents and Trademarks